(12) United States Patent
Abe et al.

(10) Patent No.: US 8,395,048 B2
(45) Date of Patent: Mar. 12, 2013

(54) WIRE MATERIAL, ELECTRONIC DEVICE, AND CAPACITOR

(75) Inventors: Masanori Abe, Tokyo (JP); Tomoaki Ueda, Kyoto (JP)

(73) Assignee: Empire Technology Development LLC, Wilmington, DE (US)

( * ) Notice: Subject to any disclaimer, the term of this patent is extended or adjusted under 35 U.S.C. 154(b) by 395 days.

(21) Appl. No.: 12/644,754

(22) Filed: Dec. 22, 2009

(65) Prior Publication Data

US 2011/0140826 A1    Jun. 16, 2011

(30) Foreign Application Priority Data

Dec. 16, 2009   (JP) ................................ 2009-285400

(51) Int. Cl.
*H01B 7/00*   (2006.01)

(52) U.S. Cl. ..... 174/110 R; 174/28; 174/36; 174/102 R; 174/113 R; 174/120 R

(58) Field of Classification Search ............. 174/110 R, 174/120, 113 R, 115–116, 36, 28, 102 R, 174/120 R
See application file for complete search history.

(56) References Cited

U.S. PATENT DOCUMENTS

| | | | |
|---|---|---|---|
| 5,099,387 A | 3/1992 | Kato et al. | |
| 5,126,483 A | 6/1992 | Sekiya et al. | |
| 7,214,880 B2 * | 5/2007 | Wiekhorst et al. | 174/80 |
| 7,214,882 B2 * | 5/2007 | Brandi et al. | 174/110 R |
| 7,388,153 B2 * | 6/2008 | Wasserman et al. | 174/110 R |

FOREIGN PATENT DOCUMENTS

| | | |
|---|---|---|
| JP | S55-062721 A | 5/1980 |
| JP | 03-215915 | 9/1991 |
| JP | 04-208591 | 7/1992 |
| JP | 06-275476 | 9/1994 |
| JP | 06203755 | * 3/1996 |
| JP | 11-220824 | 8/1999 |
| JP | 2004-119454 | 4/2004 |
| JP | 2006-352347 | 12/2006 |
| JP | 2008-035335 | 2/2008 |
| JP | 2008-251567 | 10/2008 |
| WO | WO-2009/004989 | 1/2009 |

OTHER PUBLICATIONS

Notice of Reason for Rejection for JP 2009-285400 mailed Aug. 25, 2010 (with English translation).
Notice of Reasons for Rejection for JP 2009-285400 mailed Feb. 22, 2010 (with English translation).
International Search Report and Written Opinion of the International Searching Authority for Intl. Pat. Appl. No. PCT/JP2008/061698, mailed on Oct. 7, 2008 (English translation of Written Opinion also included), 10 pp.
International Preliminary Report on Patentability for Intl. Pat. Appln. No. PCT/JP2008/061698, issued on Jan. 5, 2010 (English translation included), 11 pp.

* cited by examiner

*Primary Examiner* — Nguyen T Ha
(74) *Attorney, Agent, or Firm* — Foley & Lardner LLP

(57) ABSTRACT

A wire material includes at least two branch structures disposed so as to be continuous with each other, each of the branch structures including a conductor and a pair of branching conductors connected to the conductor. The branching conductors may be connected to a front surface and a back surface of an end of the conductor. The conductors may be in the form of a foil.

13 Claims, 10 Drawing Sheets

WIRE MATERIAL, ELECTRONIC DEVICE, AND CAPACITOR

CROSS REFERENCE TO RELATED APPLICATION

This application claims the benefit of Japanese Application No. 2009-285400 filed on Dec. 16, 2009 which is incorporated herein by reference.

BACKGROUND

1. Technical Field

The present disclosure relates to a wire material, an electronic device, and a capacitor.

2. Related Art

From the viewpoint of increasing energy efficiency, in order to reduce energy consumed by power supply circuits and electric circuits used in transport machinery including electric cars, industrial production machinery including magnetic induction heating apparatuses, home electric appliances including IH heaters and inverter air conditioners, and telecommunication equipment, power supply frequencies have been increasing year by year. Furthermore, in electronic devices, in order to store energy with high efficiency, thin-film multilayer capacitors and multilayer electrolytic capacitors have been proposed (for example, refer to patent document 1 below).

Patent document 1: Japanese Unexamined Patent Application Publication No. 6-275476

SUMMARY

However, when the drive frequency exceeds about 10 kHz, there is a tendency that an electromagnetic phenomenon referred to as a "skin effect" becomes marked. The skin effect is a phenomenon in which, in general, as the frequency of alternating current signals (current signals, power signals) flowing through a conductor increases, electrical current becomes more concentrated at the surface of the conductor, and therefore, the conductor resistance (also referred to as the "alternating-current resistance") significantly increases. The skin effect is caused by the fact that the density of a magnetic field produced by high-frequency power increases toward the center of a conductor, and the counter electromotive force produced by the magnetic field acts so as to inhibit the flow of electrical current. Although the resistance slightly differs depending on conductor materials, the skin effect inevitably can be a serious problem in high-frequency-driven electronic devices and wire materials included therein.

Specifically, under the influence of such a skin effect, for example, the resistance (high-frequency resistance) of a wire material constituting a device for which a high-frequency power supply is used or a coil formed using the wire material increases excessively, resulting in problems, such as an increase in loss to a disadvantageous degree. Furthermore, in a thin-film multilayer capacitor or a multilayer electrolytic capacitor, when such a skin effect becomes marked, among the conductors (electrodes) arranged in multilayers, electrical current mainly flows in a conductor located on the surface side, while electrical current does not easily flow in a conductor located inside. Therefore, electrical current is concentrated at the conductor located on the surface side, and the resistance (high-frequency resistance) in the capacitor increases excessively, resulting in problems, such as an increase in loss due to the capacitor and difficulty in securing a desired capacitance.

Accordingly, it is desirable to provide a wire material, an electronic device, and a capacitor as an example of the electronic device, in which loss of high-frequency electrical current (power) due to the skin effect can be suppressed.

According to the present disclosure, there is provided a wire material including at least two branch structures disposed so as to be continuous with each other, each of the branch structures including a conductor and a pair of branching conductors connected to the conductor.

As described above, when high-frequency electrical current flows through a conductor, electrical current is concentrated at the surface of the conductor due to the skin effect, and the current density at the surface of the conductor increases. As a result, the resistance of the conductor tends to increase. In contrast, according to the present disclosure, in the wire material having the configuration described above, since high-frequency electrical current flowing through a conductor is split into a pair of (two) conductors connected to the conductor in a branch structure, the area of portions in which electrical current flows, i.e., the area of surfaces, increases. Consequently, the volume through which electrical current flows effectively increases, and the current density decreases. Therefore, it is possible to sufficiently reduce the resistance (high-frequency resistance) to high-frequency electrical current due to the skin effect and thus to markedly suppress the loss of high-frequency electrical current.

Furthermore, for example, in the branch structure, a pair of branching conductors may be connected to an end of the conductor. By connecting a pair of branching conductors to the "end" of the conductor, at the branch portion of the branch structure, high-frequency electrical current can be split into the pair of branching conductors from the conductor with higher efficiency.

Furthermore, for example, in the branch structure, a pair of branching conductors may be connected to a front surface and a back surface of an end of the conductor. In such a configuration, the high-frequency electrical current flowing in a front surface portion of the conductor flows into the branching conductor connected to the front surface of the end of the conductor, while the high-frequency electrical current flowing in a back surface portion of the conductor flows into the branching conductor connected to the back surface of the conductor. Consequently, the electrical current flowing in the front surface portion and the back surface portion of the conductor is split into the pair of branching conductors with sufficiently high efficiency in the branch structure.

Furthermore, the conductors may be in the form of a foil. By using foil-shaped conductors, a proximity effect can be suppressed. The proximity effect is a phenomenon caused by an eddy current generated when a magnetic flux produced by electrical current flowing in a conductor intersects another adjacent conductor. The magnetic flux of a magnetic field produced by electrical current flowing in a foil-shaped conductor is parallel to the surface of the foil. Consequently, when a conductor is foil-shaped and very thin, the area that is flux-linked to the adjacent conductor is very small. When the flux-linkage area is small, the eddy current (loss) is small, and thus, the proximity effect is suppressed.

Furthermore, the two or more branch structures may be arranged so as not to be superposed on each other at the same position. In such a configuration, the thickness can be prevented from being increased due to the superposition of the branch structures, which is effective when the usable space is limited.

Furthermore, for example, in a branching conductor, each of one end and the other end of the branching conductor may be connected to another conductor by forming a branch structure, and the distance (spacing) between the two branch structures may be larger than the width of the branching conductor. In such a configuration, the high-frequency electrical current flowing in the conductor can uniformly spread (flow) over the surface of the conductor by the time the electrical current reaches the next branch structure. As a result, it is possible to prevent the high-frequency electrical current from becoming localized at a specific part and to prevent the current density of the specific part from becoming higher than that of the other part (i.e., to prevent the resistance from being increased in the other part). Thus, the loss of high-frequency electrical current can be suppressed.

As described above, the wire material according to the embodiment of the present disclosure can be a wire material in which measures are taken against the problem that, when three or more conductors are collectively connected or joined to a conductor, the conductor portion located inside forms a bulk, and electrical current only flows in the conductors constituting the outer surfaces. That is, a wire material may include at least two branch structures disposed so as to be continuous with each other, each of the branch structures including a conductor in the form of a foil and a pair of branching conductors, in the form of a foil, connected to a front surface and a back surface of an end of the conductor, (the pair of conductors being isolated by an insulating layer or an air layer), in which the two or more branch structures are arranged so as not to be superposed on each other at the same position, and in any of the branching conductors, each of one end and the other end of the branching conductor has a connecting portion to be connected to another conductor, and the distance between the two connecting portions is larger than the width of the branching conductor. Such a configuration tends to make it easier to markedly and reliably suppress the loss of high-frequency electrical current due to the skin effect.

Furthermore, according to the present disclosure, there is provided an electronic device which can be effectively produced using a wire material according to the present disclosure, and which includes a wire material including at least two branch structures disposed so as to be continuous with each other, each of the branch structures including a conductor and a pair of branching conductors connected to the conductor. The electronic device is, for example, a capacitor or a coil.

Furthermore, according to the present disclosure, there is provided a capacitor including a first wire material which includes at least two branch structures disposed so as to be continuous with each other, each of the branch structures including a conductor and a pair of branching conductors connected to the conductor; and a second wire material which includes at least two branch structures disposed so as to be continuous with each other, each of the branch structures including a conductor and a pair of branching conductors connected to the conductor, in which the branching conductors located at the end of the first wire material and the branching conductors located at the end of the second wire material are disposed so as to be opposed to each other with a dielectric layer or an insulating layer therebetween. In such a configuration, high-frequency electrical current can be supplied, with low loss, to the branching conductors at the end of the first wire material and the branching conductors at the end of the second wire material. Thus, the storage capacitance of the capacitor can be increased, and it is possible to sufficiently respond to a high-speed switching operation.

DESCRIPTION OF THE EXEMPLARY EMBODIMENTS

Figure 1:
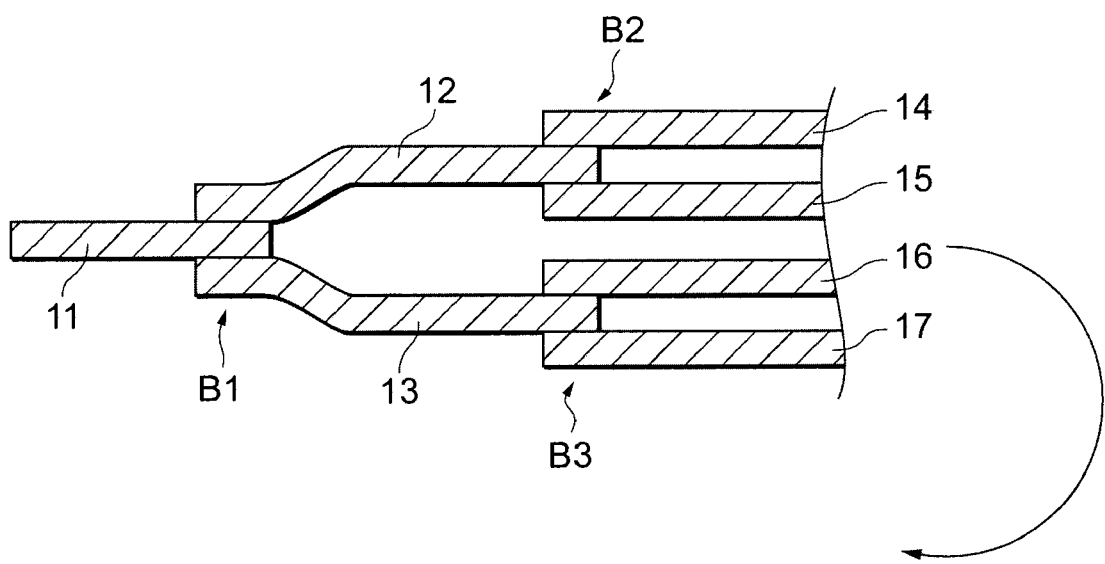
FIG. 1 is a cross-sectional view showing a wire material according to a first embodiment.

The embodiments of the present disclosure will be described below with reference to the drawings. The same components are represented by the same reference numerals, and a repeated description will be omitted. Furthermore, the positional relationships, such as upper/lower and left/right, are based on those illustrated in the drawings unless otherwise specified. The dimensional ratios of the drawings are not limited to those shown in the drawings. The embodiments disclosed herein are merely illustrative of the present disclosure. It is therefore to be understood that the present disclosure is not limited to the embodiments, and various modifications may be made to the embodiments without departing the spirit and scope of the present disclosure.

First Embodiment

FIG. 1 is a cross-sectional view showing a wire material 1 according to a first embodiment. As shown in FIG. 1, the wire material 1 includes conductors 11 to 17. One end of the conductor 12 is connected to a front surface of one end of the conductor 11, and one end of the conductor 13 is connected to a back surface of the end of the conductor 11. One end of the conductor 14 is connected to a front surface of the other end of the conductor 12, and one end of the conductor 15 is connected to a back surface of the other end of the conductor 12. One end of the conductor 16 is connected to a front surface of the other end of the conductor 13, and one end of the conductor 17 is connected to a back surface of the other end of the conductor 13.

The wire material 1 of the first embodiment has a branch structure B1 in which a pair of conductors 12 and 13 are respectively connected to the front and back surfaces of the end of the conductor 11, a branch structure B2 in which a pair of conductors 14 and 15 are respectively connected to the front and back surfaces of the end of the conductor 12, and a branch structure B3 in which a pair of conductors 16 and 17 are respectively connected to the front and back surfaces of the end of the conductor 13. In such a manner, in the wire material 1 of this embodiment, at least two branch structures are disposed so as to be continuous with each other. That is, the conductors 12 and 13, which are branching conductors in the branch structure B1, are provided with the branch structures B2 and B3, respectively. Furthermore, any one or each of the conductors 14, 15, 16, and 17 may be provided with another branch structure.

The conductors may be composed of a metal or an alloy. For example, copper can be used for the conductors. Besides copper, aluminum, platinum, gold, silver, palladium, tin, nickel, chromium, or the like may be used.

As the conductors, metal foils (foil-shaped conductors) may be used. In such a case, metal foils, for example, composed of copper, aluminum, platinum, gold, silver, tin, iron, nickel, cobalt, chromium, brass, duralumin, stainless steel, or the like may be used. The thickness of the foil-shaped conductors is, for example, 200 µm or less. By using the foil-shaped conductors, the proximity effect can be suppressed. The proximity effect is a phenomenon caused by an eddy current generated when a magnetic flux produced by electrical current flowing in a conductor intersects another adjacent conductor. The magnetic flux of a magnetic field produced by electrical current flowing in a foil-shaped conductor is parallel to the surface of the foil. Consequently, when a conductor is foil-shaped and very thin, the area that is flux-linked to the adjacent conductor is very small. When the flux-linkage area is small, the eddy current is small, and thus, the proximity effect is suppressed.

In order to join the conductors together, for example, soldering, brazing, welding, direct bonding, thermal bonding, ultrasonic welding, or the like may be used. Although not shown, in order to prevent unnecessary connections except for the connections in the branch structures, an insulating coating layer is disposed on the surfaces of the conductors. The insulating coating layer is, for example, composed of any one of glass epoxy, polyimide, fluoroplastic such as polytetrafluoroethylene, polyurethane, polyvinylidene chloride, polyvinyl chloride, polyethylene, Amilan, and polypropylene, or a combination thereof.

Figure 2:
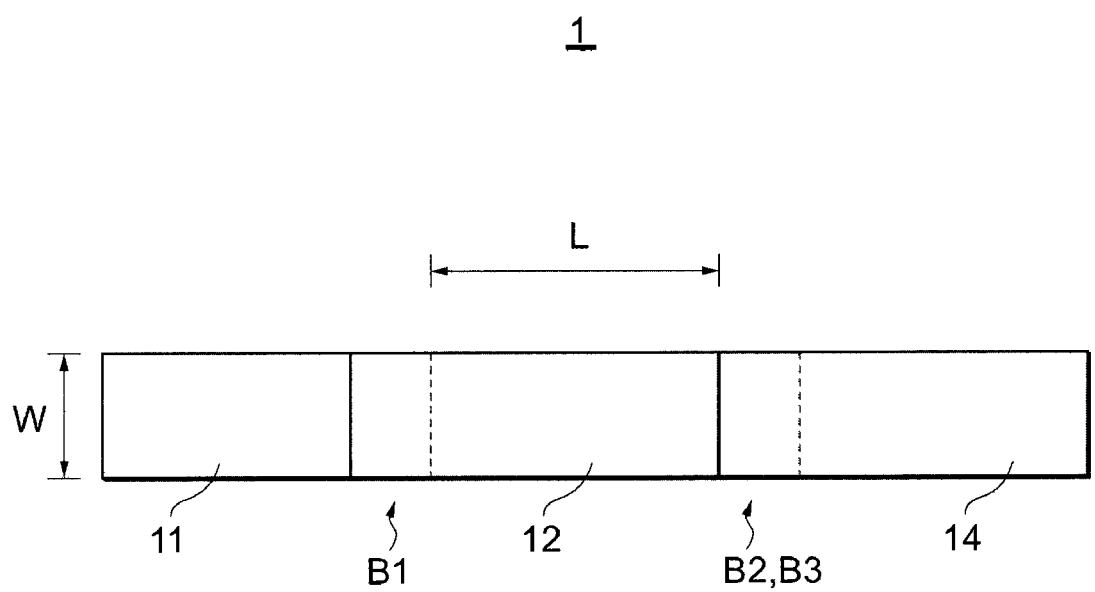
FIG. 2 is a plan view showing the wire material according to the first embodiment.

FIG. 2 is a plan view of the wire material 1. As shown in FIG. 2, one end of the conductor 12 is connected to the conductor 11, and the other end of the conductor 12 is connected to the conductor 14. The distance L between the connecting portion of the conductors 11 and 12 and the connecting portion of the conductors 12 and 14 is larger than the width W of the conductor 12. In such a configuration, the high-frequency electrical current split from the conductor 11 into the conductor 12 can uniformly spread over the surface of the conductor 12 by the time the electrical current reaches the next branch structure B2. As a result, it is possible to prevent the high-frequency electrical current from becoming localized at a specific surface of the conductor. Thus, it is possible to decrease the current density of the high-frequency electrical current flowing through one conductor, and the resistance to the high-frequency electrical current can be decreased.

In the wire material 1 of the first embodiment, the high-frequency electrical current flowing in the conductor 11 is equally split into a pair of conductors 12 and 13 which are connected to the conductor 11 in the branch structure B1. The electrical current split into the conductor 12 is equally split into a pair of conductors 14 and 15 in the branch structure B2. Meanwhile, the electrical current split into the conductor 13 is equally split into a pair of conductors 16 and 17 in the branch structure B3. When high-frequency electrical current flows through a conductor, electrical current is concentrated at the surface of the conductor due to the skin effect, and the current density in the surface of the conductor increases. As a result, the resistance of the conductor tends to increase. In this embodiment, since high-frequency electrical current is split in the branch structures B1, B2, and B3, the current density of high-frequency electrical current flowing through one conductor can be decreased, and thus it is possible to suppress an increase in the current density due to the skin effect. Consequently, it is possible to provide a wire material which has a low resistance to high-frequency electrical current and in which loss of high-frequency electrical current is suppressed.

By winding the wire material 1 (refer to FIGS. 1, 4 to 6) in a direction indicated by the arrow, a coil is formed. In such a case, an appropriate core may be used. The method of winding the wire material 1 is not particularly limited, and the wire material 1 may be wound concentrically (spirally) or helically.

Modifications of the wire material 1 will now be described with reference to the drawings.

Figure 3:
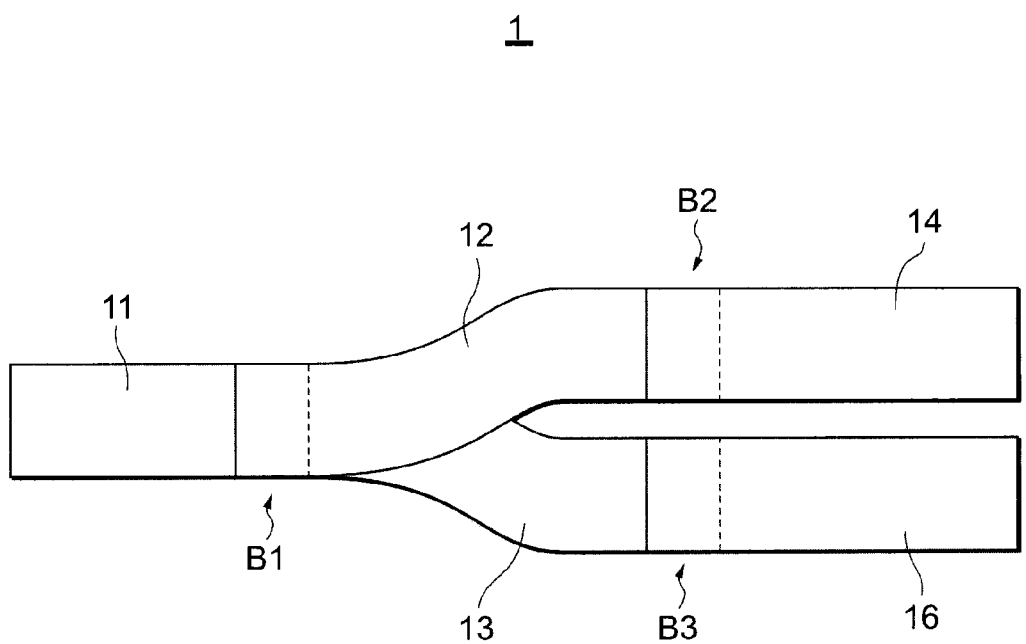
FIG. 3 is a plan view showing a modification example of a wire material according to the first embodiment.

FIG. 3 is a plan view showing a modification example of the wire material 1 according to the first embodiment. As shown in FIG. 3, the other end of the conductor 12 and the other end of the conductor 13 may be shifted from each other in the planar direction. Such a configuration is effective, for example, when the thickness of the wire material is limited.

Figure 4:
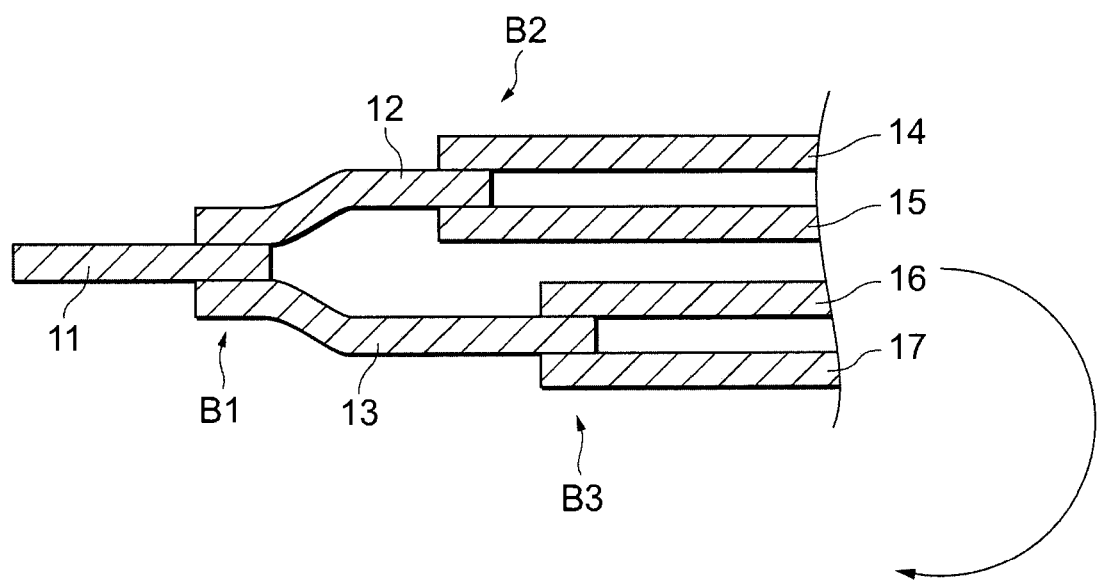
FIG. 4 is a cross-sectional view showing a modification example of a wire material according to the first embodiment.

FIG. 4 is a cross-sectional view showing a modification example of the wire material 1 according to the first embodiment. As shown in FIG. 4, a branch structure B2 on the front surface side of a conductor may be shifted from a branch structure B3 on the back surface side of the conductor. In the example shown in FIG. 4, the branch structure B2 of the conductor 12 is shifted from the branch structure B3 of the conductor 13 in the planar direction. The wire material 1 shown in FIG. 4 can also have the same advantage as the wire material shown in FIG. 1. Such a configuration is also effective, for example, when the thickness of the wire material is limited.

Figure 5:
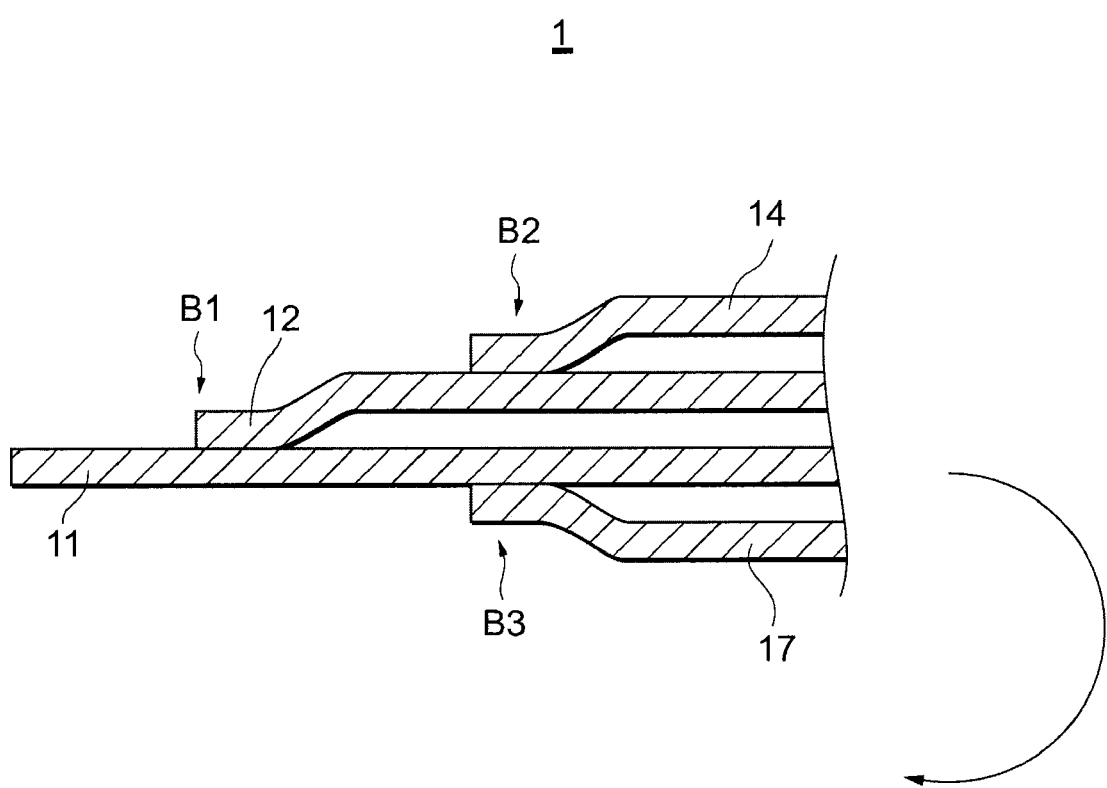
FIG. 5 is a cross-sectional view showing a modification example of a wire material according to the first embodiment.

FIG. 5 is a cross-sectional view showing a modification example of the wire material 1 according to the first embodiment. As shown in FIG. 5, one end of a conductor 12 is connected to the middle of the front surface of a conductor 11, and one end of a conductor 17 is connected to the middle of the back surface of the conductor 11. One end of a conductor 14 is connected to the middle of the front surface of the conductor 12. In such a manner, in a branch structure, a conductor and one of a pair of conductors to be connected to the conductor may be integrally configured.

Even in such a configuration, the wire material 1 is provided with a branch structure B1 connected to the conductor 11, and branch structures B2 and B3 respectively provided to the conductors 12 and 11 branched in the branch structure B1. The high-frequency electrical current flowing in the conductor 11 is substantially equally split into a pair of conductors 11 and 12 in the branch structure B1. The electrical current split into the conductor 12 is substantially equally split into a pair of conductors 12 and 14 in the branch structure B2. The electrical current which has passed the branch structure B1 and flows in the conductor 11 is substantially equally split into a pair of conductors 11 and 17 in the branch structure B3.

Figure 6:
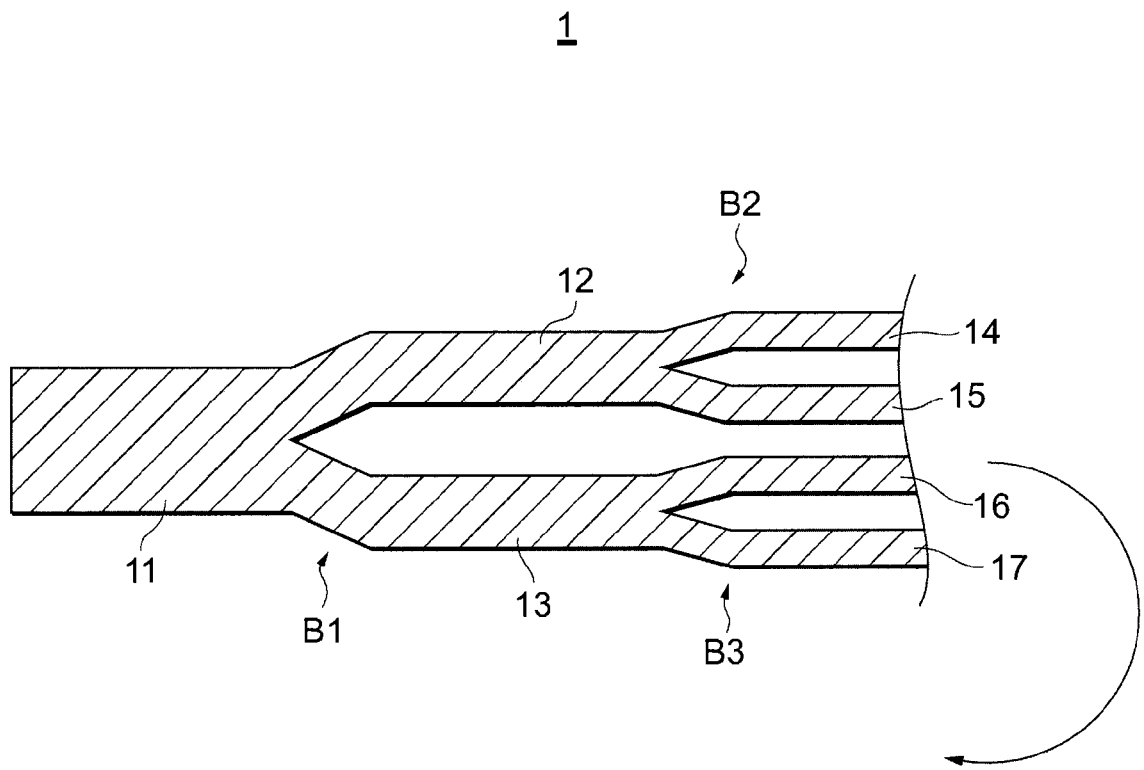
FIG. 6 is a cross-sectional view showing a modification example of a wire material according to the first embodiment.

FIG. 6 is a cross-sectional view showing a modification example of the wire material 1 according to the first embodiment. As shown in FIG. 6, one end of a conductor 11 is divided into conductors 12 and 13 to form a branch structure B1. The other end of the conductor 12, one end of which is connected to the conductor 11, is divided into conductors 14 and 15 to form a branch structure B2. Furthermore, the other end of the conductor 13, one end of which is connected to the conductor 11, is divided into conductors 16 and 17 to form a branch structure B3. In this example, by dividing a front surface portion and a back surface portion of a conductor from each other, branch structures are formed. In this way, in a branch structure, a part of a conductor and a pair of conductors to be connected to the conductor may be integrally configured. Furthermore, the branch structures integrally configured in such a manner may be shifted in the planar direction so as to have the arrangement as in the modification example shown in FIG. 3 or 4.

Even in such a configuration, the wire material 1 is provided with a branch structure B1 connected to the conductor 11, and branch structures B2 and B3 respectively provided to the conductors 12 and 13 branched in the branch structure B1. The high-frequency electrical current flowing in the conductor 11 is substantially equally split into a pair of conductors 12 and 13 in the branch structure B1. The electrical current split into the conductor 12 is substantially equally split into a pair of conductors 14 and 15 in the branch structure B2. The electrical current split into the conductor 13 is substantially equally split into a pair of conductors 16 and 17 in the branch structure B3.

Second Embodiment

Figure 7:
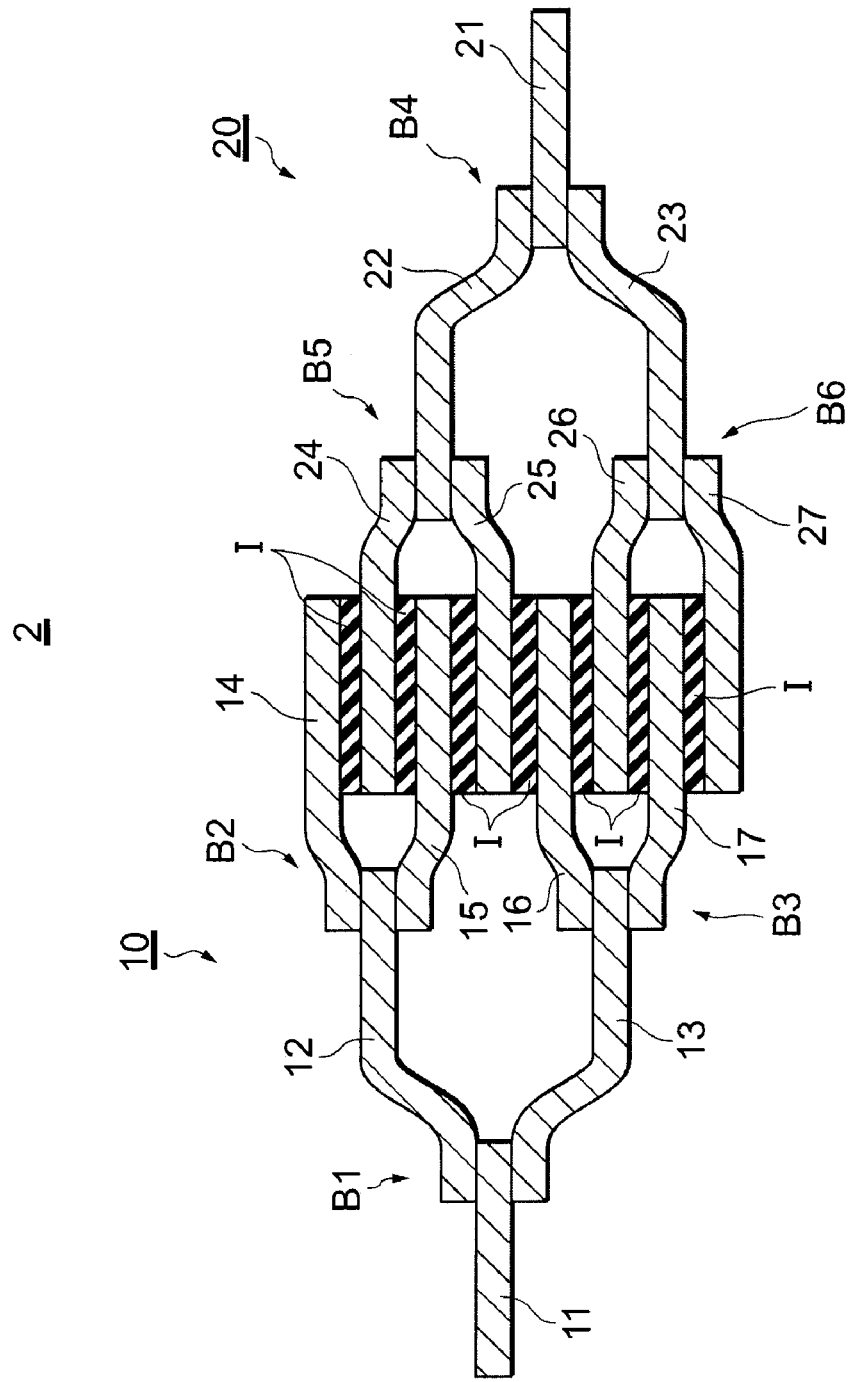
FIG. 7 is a cross-sectional view showing a capacitor according to a second embodiment.

FIG. 7 is a cross-sectional view showing a capacitor 2 formed using wire materials of the first embodiment. As shown in FIG. 7, the capacitor 2 includes two wire materials 10 and 20.

The configuration of the wire material (first wire material) 10 is the same as that of the wire material 1 of the first embodiment. That is, as shown in FIG. 7, the wire material 10 includes conductors 11 to 17. One end of the conductor 12 is connected to a front surface of one end of the conductor 11, and one end of the conductor 13 is connected to a back surface of the end of the conductor 11. One end of the conductor 14 is connected to a front surface of the other end of the conductor 12, and one end of the conductor 15 is connected to a back surface of the other end of the conductor 12. One end of the conductor 16 is connected to a front surface of the other end of the conductor 13, and one end of the conductor 17 is connected to a back surface of the other end of the conductor 13.

The wire material 10 has a branch structure B1 in which a pair of conductors 12 and 13 are respectively connected to the front and back surfaces of the end of the conductor 11, a branch structure B2 in which a pair of conductors 14 and 15 are respectively connected to the front and back surfaces of the end of the conductor 12, and a branch structure B3 in which a pair of conductors 16 and 17 are respectively connected to the front and back surfaces of the end of the conductor 13. In such a manner, in the wire material 10, as in the first embodiment, at least two branch structures are disposed so as to be continuous with each other. Furthermore, any one or each of the conductors 14, 15, 16, and 17 may be provided with another branch structure.

The configuration of the wire material (second wire material) 20 is also the same as that of the wire material 1 of the first embodiment. However, the spreading direction of branches in the wire material 20 is opposite to the spreading direction of branches in the wire material 10. As shown in FIG. 7, the wire material 20 includes conductors 21 to 27. One end of the conductor 22 is connected to a front surface of one end of the conductor 21, and one end of the conductor 23 is connected to a back surface of the end of the conductor 21. One end of the conductor 24 is connected to a front surface of the other end of the conductor 22, and one end of the conductor 25 is connected to a back surface of the other end of the conductor 22. One end of the conductor 26 is connected to a front surface of the other end of the conductor 23, and one end of the conductor 27 is connected to a back surface of the other end of the conductor 23.

The wire material 20 has a branch structure B4 in which a pair of conductors 22 and 23 are respectively connected to the front and back surfaces of the end of the conductor 21, a branch structure B5 in which a pair of conductors 24 and 25 are respectively connected to the front and back surfaces of the end of the conductor 22, and a branch structure B6 in which a pair of conductors 26 and 27 are respectively connected to the front and back surfaces of the end of the conductor 23. In such a manner, in the wire material 20, as in the first embodiment, at least two branch structures are disposed so as to be continuous with each other. Furthermore, any one or each of the conductors 24, 25, 26, and 27 may be provided with another branch structure.

As shown in FIG. 7, the conductors 14 to 17 at the end of the wire material 10 and the conductors 24 to 27 at the end of the wire material 20 are alternately arranged. A dielectric layer and/or insulating layer I is disposed between the conductors 14 and 24, between the conductors 24 and 15, between the conductors 15 and 25, between the conductors 25 and 16, between the conductors 16 and 26, between the conductors 26 and 17, and between the conductors 17 and 27. As the material for the dielectric layer and/or insulating layer I, a high dielectric constant material, such as the one used for a thin-film capacitor formed using a thin-film process can be used. Examples thereof include barium titanate ($BaTiO_3$), titanium oxide ($TiO_2$), alumina, silicon nitride ($Si_3N_4$), silicon dioxide ($SiO_2$), tantalum oxide ($Ta_2O_5$), aluminum nitride (AlN), and magnesium oxide (MgO). Alternatively, as the material for the dielectric layer and/or insulating layer I, the same insulating material as that for the insulating coating layer described above can be used. Examples thereof include glass epoxy, polyimide, fluoroplastic such as polytetrafluoroethylene, polyurethane, polyvinylidene chloride, polyvinyl chloride, polyethylene, Amilan, and polypropylene.

As described above, the capacitor 2 is a multilayer capacitor including a plurality of charge storage layers. In the capacitor 2, charges are stored between the conductors 14 and 24, between the conductors 24 and 15, between the conductors 15 and 25, between the conductors 25 and 16, between the conductors 16 and 26, between the conductors 26 and 17, and between the conductors 17 and 27.

In the capacitor according to the second embodiment, high-frequency electrical current can be supplied, with low loss, from the conductor 11 to the conductors 14 to 17 at the end, while high-frequency electrical current can be supplied, with low loss, from the conductor 21 to the conductors 24 to 27 at the end. Consequently, in the second embodiment, a multilayer capacitor can be configured, and high-frequency electrical current can be supplied, with low loss, to the conductors at the ends. Thus, the storage capacitance of the capacitor can be increased.

Third Embodiment

Figure 8:
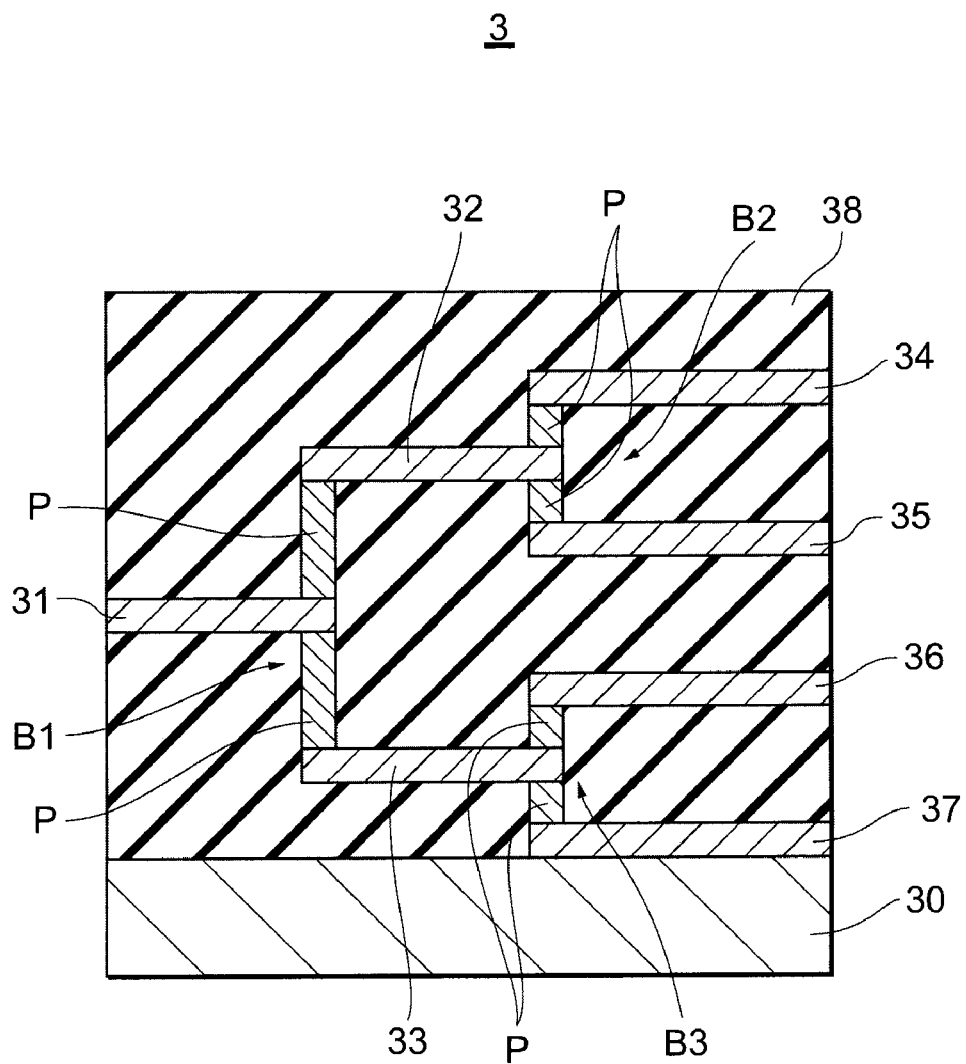
FIG. 8 is a cross-sectional view showing a wire material according to a third embodiment, the wire material being formed using a thin-film process.

In a third embodiment, an example of a wire material including foil-shaped conductors formed using a thin-film process will be described. FIG. 8 is a cross-sectional view showing a wire material 3 according to the third embodiment.

As shown in FIG. 8, the wire material 3 is formed using a thin-film process on a substrate 30 having insulating properties. The wire material 3 includes conductors 31 to 37. One end of the conductor 32 is connected via a plug P to a front surface of one end of the conductor 31, and one end of the conductor 33 is connected via a plug P to a back surface of the end of the conductor 31. One end of the conductor 34 is connected via a plug P to a front surface of the other end of the conductor 32, and one end of the conductor 35 is connected via a plug P to a back surface of the other end of the plug 32. One end of the conductor 36 is connected via a plug P to a front surface of the other end of the conductor 33, and one end of the conductor 37 is connected via a plug P to a back surface of the other end of the conductor 33. In the example shown in FIG. 8, a layer of the conductor 37, a layer of the conductor 33, a layer of the conductor 36, a layer of the conductor 31, a layer of the conductor 35, a layer of the conductor 32, and a layer of the conductor 34 are disposed in that order on the substrate 30. Each two adjacent conductors are separated by an insulating layer 38.

The wire material 3 of the third embodiment has a branch structure B1 in which a pair of conductors 32 and 33 are respectively connected to the front and back surfaces of the end of the conductor 31, a branch structure B2 in which a pair of conductors 34 and 35 are respectively connected to the front and back surfaces of the end of the conductor 32, and a branch structure B3 in which a pair of conductors 36 and 37 are respectively connected to the front and back surfaces of the end of the conductor 33. In such a manner, in the wire material 3 of this embodiment formed using a thin-film process, as in the first embodiment, at least two branch structures can be disposed so as to be continuous with each other. Furthermore, any one or each of the conductors 34, 35, 36, and 37 may be provided with another branch structure.

The conductors may be composed of a metal or an alloy. For example, copper can be used for the conductors. Besides copper, aluminum, platinum, gold, silver, palladium, tin, nickel, chromium, or the like may be used. The layers of the conductors may be formed, for example, by sputtering, vapor deposition, plating, printing, or photolithography.

Examples of the material for the insulating layer 38 include, but are not limited to, inorganic insulating materials, such as silicon nitride, aluminum oxide, and silicon dioxide; and organic insulating materials, such as polyimide and epoxy resins. The insulating layer 38 may be formed by coating, vapor deposition, or the like.

As described above, a wire material according to the present disclosure can be formed using a thin-film process. Consequently, it is possible to form, using a thin-film process, a wire material in which loss of high-frequency electrical current due to the skin effect can be suppressed. Furthermore, the structure of the capacitor shown in FIG. 7 can be formed using a thin-film process.

Modifications of the wire material 3 formed using a thin-film process will now be described with reference to the drawings.

Figure 9:
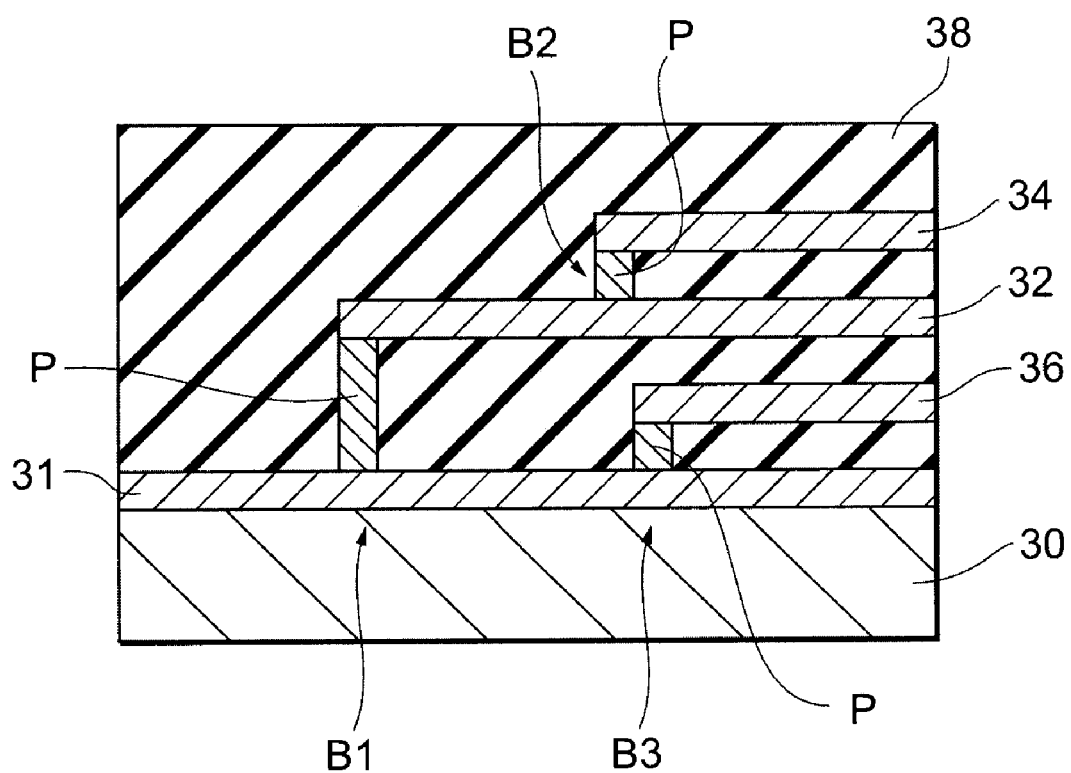
FIG. 9 is a cross-sectional view showing a modification example of a wire material according to the third embodiment, the wire material being formed using a thin-film process.

FIG. 9 is a cross-sectional view showing a modification example of the wire material 3 according to the third embodiment. As shown in FIG. 9, one end of a conductor 32 is connected via a plug P to the middle of the front surface of a conductor 31, and one end of a conductor 34 is connected via a plug P to the middle of the front surface of the conductor 32. One end of a conductor 36 is connected via a plug P to the middle of the front surface of the conductor 31.

Even in such a configuration, the wire material 3 is provided with a branch structure B1 connected to the conductor 31, and branch structures B2 and B3 respectively provided to the conductors 32 and 31 branched in the branch structure B1. In such a manner, in the wire material 3 formed using a thin-film process, in a branch structure, a conductor and one of a pair of conductors to be connected to the conductor may be integrally configured.

Figure 10:
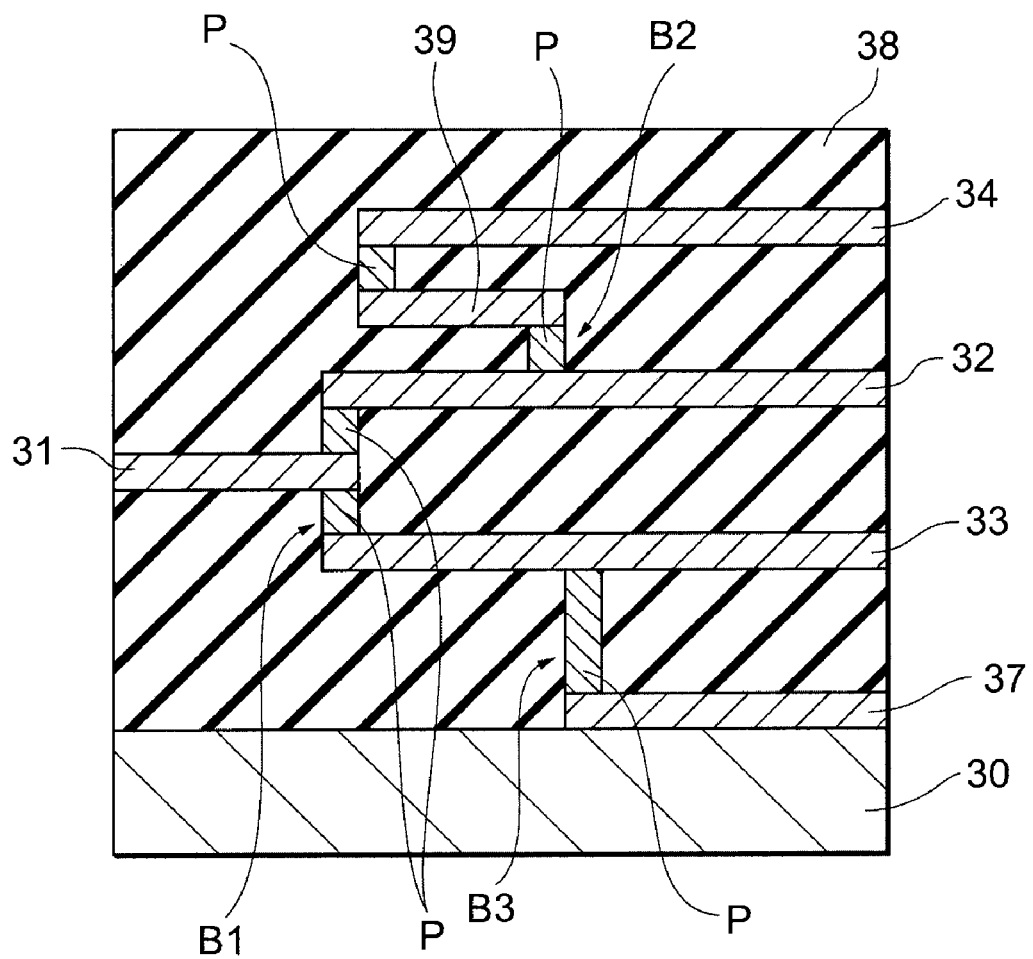
FIG. 10 is a cross-sectional view showing a modification example of a wire material according to the third embodiment, the wire material being formed using a thin-film process.

FIG. 10 is a cross-sectional view showing a modification example of the wire material 3 according to the third embodiment. As shown in FIG. 10, one end of a conductor 32 is connected via a plug P to a front surface of the end of a conductor 31, and one end of a conductor 33 is connected via a plug P to a back surface of the end of the conductor 31. One end of a conductor 39 is connected via a plug P to the middle of a front surface of the conductor 32, and the other end of the conductor 39 is connected via a plug P to one end of a conductor 34. The conductor 39 extends in a direction opposite the direction in which the other conductors extend. A conductor 37 is connected via a plug P to the middle of a back surface of the conductor 33.

In the wire material 3 shown in FIG. 10, in the branch structure B2, the conductors 32 and 39 are arranged such that electrical current flows in opposite directions between the conductors 32 and 39. In such a manner, inside a wire material 3, some of the conductors may be arranged so as to extend in a direction opposite the direction in which the other conductors extend.

As described above, it is to be understood that the present disclosure is not limited to the embodiments described above, and various modifications may be made to the embodiments without departing the spirit and scope of the present disclosure.

The wire materials, electronic devices, and capacitors according to the present disclosure can be applied to power supply circuits and electric circuits used in transport machinery including electric cars, industrial production machinery including magnetic induction heating apparatuses, home electric appliances including IH heaters and inverter air conditioners, and telecommunication equipment, in which higher efficiency and lower loss in terms of high-frequency electric current are desired. Specifically, the wire materials, electronic devices, and capacitors according to the present disclosure can be, for example, applied to electric cars, storage capacitors, solenoid valves, inverters, converters, flyback transformers, choke coils, high-frequency coils, magnetic induction heaters, and IH heaters.

What is claimed is:

1. A wire material comprising:
   at least two branch structures disposed so as to be continuous with each other, each of the branch structures including a conductor in the form of a foil and a pair of branching conductors, in the form of a foil, connected to a front surface and a back surface of an end of the conductor,
   wherein the two or more branch structures are arranged so as not to be superposed on each other at the same position; and
   in any of the branching conductors, each of one end and the other end of the branching conductor has a connecting portion to be coupled to another conductor, and the distance between the two connecting portions is larger than the width of the branching conductor.

2. A wire material comprising:
   a first branch structure comprising:
      a first conductor;
      a second conductor branching off of an end of the first conductor; and
      a third conductor branching off of the end of the first conductor; and
   a second branch structure coupled to the first branch structure, wherein the second branch structure comprises:
      a fourth conductor coupled to an end of the second conductor of the first branch structure;
      a fifth conductor branching off of an end of the fourth conductor; and
      a sixth conductor branching off of the end of the fourth conductor.

3. The wire material according to claim 2, wherein the second and third conductors are coupled to a front surface and a back surface, respectively, of the end of the first conductor, and wherein the fifth and sixth conductors are coupled to a front surface and a back surface, respectively, of the end of the fourth conductor.

4. The wire material according to claim 2, wherein each of the first, second, third, fourth, fifth, and sixth conductors are in the form of a foil.

5. The wire material according to claim 2, wherein the first and second branch structures are arranged so as not to be superposed on each other at the same position.

6. The wire material according to claim 2, wherein, in any of the second, third, fifth, and sixth conductors, each of one end and the other end of the respective second, third, fifth, and sixth conductor has a connecting portion to be coupled to another conductor, and the distance between the two connecting portions is larger than the width of the respective second, third, fifth, and sixth conductor.

7. A capacitor comprising:
a first wire material comprising:
a first branch structure comprising:
a first conductor;
a second conductor branching off of an end of the first conductor; and
a third conductor branching off of the end of the first conductor; and
a second branch structure coupled to the first branch structure, wherein the second branch structure comprises:
a fourth conductor coupled to an end of the second conductor of the first branch structure;
a fifth conductor branching off of an end of the fourth conductor; and
a sixth conductor branching off of the end of the fourth conductor; and
a second wire material which includes at least two branch structures disposed so as to be continuous with each other, each of the branch structures including a conductor and a pair of branching conductors coupled to the conductor,
wherein at least one of the second, third, fifth, or sixth conductors of the first wire material and the branching conductors located at the end of the second wire material are disposed so as to be opposed to each other with at least one of a dielectric layer or an insulating layer therebetween.

8. An electronic device comprising:
a wire material comprising:
a first branch structure comprising:
a first conductor;
a second conductor branching off of an end of the first conductor; and
a third conductor branching off of the end of the first conductor; and
a second branch structure coupled to the first branch structure, wherein the second branch structure comprises:
a fourth conductor coupled to an end of the second conductor of the first branch structure;
a fifth conductor branching off of an end of the fourth conductor; and
a sixth conductor branching off of the end of the fourth conductor.

9. The electronic device according to claim 8, wherein the electronic device is a capacitor or a coil.

10. The electronic device according to claim 8, wherein the second and third conductors are coupled to a front surface and a back surface, respectively, of the end of the first conductor, and wherein the fifth and sixth conductors are coupled to a front surface and a back surface, respectively, of the end of the fourth conductor.

11. The electronic device according to claim 8, wherein each of the first, second, third, fourth, fifth, and sixth conductors are in the form of a foil.

12. The electronic device according to claim 8, wherein the first and second branch structures are arranged so as not to be superposed on each other at the same position.

13. The electronic device according to claim 8, wherein, in any of the second, third, fifth, and sixth conductors, each of one end and the other end of the respective second, third, fifth, and sixth conductor has a connecting portion to be coupled to another conductor, and the distance between the two connecting portions is larger than the width of the respective second, third, fifth, and sixth conductor.

* * * * *

UNITED STATES PATENT AND TRADEMARK OFFICE
CERTIFICATE OF CORRECTION

PATENT NO. : 8,395,048 B2
APPLICATION NO. : 12/644754
DATED : March 12, 2013
INVENTOR(S) : Abe et al.

Page 1 of 1

It is certified that error appears in the above-identified patent and that said Letters Patent is hereby corrected as shown below:

On the Title Page, Item (56), under "OTHER PUBLICATIONS", in Column 2, Line 10, delete "issed" and insert -- issued --, therefor.

In the Specification

In Column 1, Line 30, delete "6-275476" and insert -- 6-275476. --, therefor.

In Column 4, Line 25, delete "DESCRIPTION" and insert -- DETAILED DESCRIPTION --, therefor.

Signed and Sealed this
Twentieth Day of August, 2013

Teresa Stanek Rea
*Acting Director of the United States Patent and Trademark Office*